United States Patent
Vowe

(10) Patent No.: US 10,049,072 B2
(45) Date of Patent: Aug. 14, 2018

(54) METHOD AND APPARATUS FOR USE IN A DATA PROCESSING SYSTEM

(71) Applicant: Infineon Technologies AG, Neubiberg (DE)

(72) Inventor: Achim Vowe, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1008 days.

(21) Appl. No.: 14/083,434

(22) Filed: Nov. 18, 2013

(65) Prior Publication Data

US 2015/0143005 A1    May 21, 2015

(51) Int. Cl.
G06F 13/42    (2006.01)
G06F 11/30    (2006.01)

(52) U.S. Cl.
CPC ...... *G06F 13/4226* (2013.01); *G06F 11/3027* (2013.01)

(58) Field of Classification Search
CPC .......................... G06F 13/4226; G06F 11/3027
See application file for complete search history.

(56) References Cited

U.S. PATENT DOCUMENTS

| | | | | |
|---|---|---|---|---|
| 2002/0087937 A1* | 7/2002 | Muth | ................... | G06F 13/4068 714/819 |
| 2004/0158781 A1* | 8/2004 | Pihet | ................... | H04L 12/2602 714/712 |
| 2010/0201399 A1* | 8/2010 | Metzner | ................ | H04L 25/028 326/83 |
| 2011/0231053 A1* | 9/2011 | Kuramochi | ....... | H04L 12/40026 701/31.4 |
| 2012/0210154 A1* | 8/2012 | Hartwich | .......... | H04L 12/40039 713/323 |
| 2013/0294460 A1* | 11/2013 | Hell | .......................... | H03F 3/24 370/470 |
| 2014/0156893 A1* | 6/2014 | Monroe | ................ | G06F 13/372 710/117 |
| 2014/0328357 A1* | 11/2014 | Fredriksson | .......... | H04J 3/0614 370/520 |
| 2014/0337549 A1* | 11/2014 | Hartwich | ............ | H04L 12/4013 710/106 |

FOREIGN PATENT DOCUMENTS

DE    10218645 A1    11/2003
WO    WO2013030095    *    7/2013

* cited by examiner

*Primary Examiner* — Nimesh G Patel
(74) *Attorney, Agent, or Firm* — Eschweiler & Potashnik, LLC

(57) ABSTRACT

A method is described, for use in a data processing system, the system having a node and a communication link, wherein the communication link is coupled to the node. The method can comprise obtaining first digital signal information associated with a first signal, transmitting the first signal from the node to the communication link, receiving a second signal from the communication link at the node, and analyzing the second signal to obtain second digital signal information. The method can further include combining first digital signal information with second digital signal information and flagging a combination outside a predetermined condition space. Further, an apparatus, for use in the data processing system is described that can be operative to perform the method. A data processing system is also described.

20 Claims, 8 Drawing Sheets

METHOD AND APPARATUS FOR USE IN A DATA PROCESSING SYSTEM

BACKGROUND

The acceptance and introduction of serial communication to more and more applications has led to increasing demand for bandwidth in bus communication such as communication in Controller Area Network (CAN) busses. CAN is a message-based protocol, designed specifically for automotive applications but now also used in other areas such as aerospace, maritime, industrial automation and medical equipment. System developers looked for alternative communication options in certain applications. These applications can be realized more comfortably with the new protocol CAN FD that allows data rates higher than 1 MBit/s and payloads longer 8 bytes per frame. As data rates in bus communication systems become higher, communication becomes more and more prone to communication errors. In some systems, errors can be identified by comparing, bit by bit, a bit stream received with a bit stream transmitted. The comparing, bit by bit, requires information about delay between transmission of a bit and reception of the bit. External influences can vary delay. Information about delay may therefore be inaccurate and results of comparing can be misleading.

SUMMARY

The following presents a simplified summary in order to provide a basic understanding of one or more aspects of the described implementations. This summary is not an extensive overview of the described implementations, and is neither intended to identify key or critical elements of the described implementations, nor to delineate the scope thereof. Rather, the primary purpose of the summary is to present some concepts of the described implementations in a simplified form as a prelude to the more detailed description that is presented later.

In an aspect, a method as defined in the independent method claim is provided. In another aspect, a system as defined in the independent system claim is provided. In yet another aspect, an apparatus as defined in the independent apparatus claim is provided. In a further aspect, a computer-readable medium storing instruction code thereon that when executed causes one or more processors to perform steps of a method for use in a data processing system is provided. The dependent claims define embodiments according to the invention in one or more aspects. It is to be noted that features of these embodiments may be combined with each other unless specifically noted to the contrary. For example, elements of method embodiments may be implemented in embodiments of the system. For example, features of an embodiment of the system may be used to perform steps of an embodiment of the method.

Described herein are embodiments related to a method, a system and an apparatus. The described embodiments can be useful, for example, in the field of data processing. In comparison with conventional solutions at least one effect can be in case the communication link operates to feed forward signals to units coupled to the communication link, the first signal that is transmitted to the communication link can be observed as a second signal received from the communication link. The observed second signal can be analysed. Bearing in mind that a signal has a pattern in time, at any point in time in an interval with the signal, an analysis result can be a combination of first quantifiable characteristics quantified in a first signal pattern offset against second quantifiable characteristics quantified in a second signal pattern. For example, a number of first events so far registered in a first signal pattern can be offset against a number of second events so far registered in a second signal pattern. First quantifiable characteristics and second quantifiable characteristics can be of the same type such as edges in a digital signal pattern. Thus, at any time during the signal analysis up to the end of the analysis, based on the analysis result in light of some consistency criteria, the analysed second signal can be determined either to be consistent with the first signal or to be inconsistent. If found inconsistent, an error condition can be flagged. Compared with conventional solutions at least one effect can be that consistency criteria can be selected so that determining inconsistency can need less processing power and/or can be invariant with respect to, or at least be less sensitive to, properties in the respective signal patterns other than the quantifiable characteristic. For example, a running account of edges registered in the first signal and offset against edges detected in the second signal can ignore signal timing, signal delay, noise impressed on the signal and other distracting properties. 'Ignoring' can imply 'not processing' which can effect processing power savings. Further, 'ignoring distracting properties' can imply more accurate consistency/inconsistency findings.

This summary is submitted with the understanding that it will not be used to interpret or limit the scope or meaning of the claims. This summary is not intended to identify key features or essential features of the claimed subject matter, nor is it intended to be used as an aid in determining the scope of the claimed subject matter. Other methods, apparatus and systems are also disclosed. Those skilled in the art will recognise additional features and advantages upon reading the following detailed description, and upon viewing the accompanying drawings.

DETAILED DESCRIPTION

The claimed subject matter is described below with reference to the drawings. The detailed description references the accompanying figures. The same numbers are used throughout the drawings to reference like features and components. For purposes of explanation, numerous specific details are set forth in order to provide a thorough understanding of the claimed subject matter. It may be evident, however, that the claimed subject matter may be practised without these specific details.

ILLUSTRATED EMBODIMENTS

Figure 1:
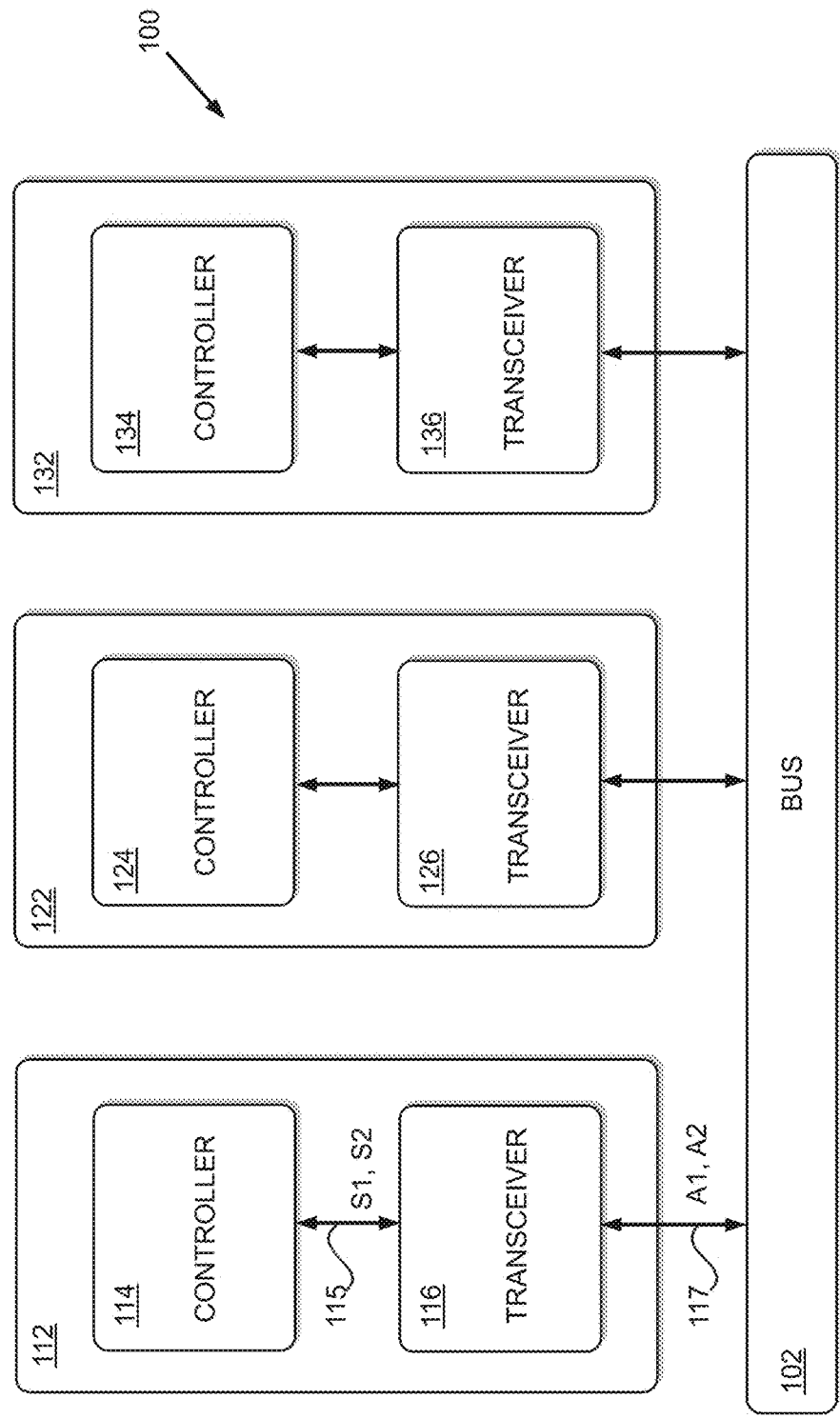
FIG. 1 is a block diagram that illustrates schematically a system in accordance with some embodiments.

FIG. 1 is a block diagram illustrating schematically a system 100 in accordance with some embodiments. System 100 comprises a bus 102 that can form a communication link for a plurality of nodes that are coupled to bus 102. In the embodiment illustrated in FIG. 1, three nodes 112, 122 and 132 are coupled to bus 102. This number should not be understood to be fixed or otherwise be seen as limiting. Bus 102 can be configured for coupling any other number of nodes to bus 102. Another number of nodes can be coupled to bus 102. In some implementations nodes can be coupled to bus 102 and decoupled from bus 102 as needed in operation. In some implementations bus 102 is operative to feed forward signals to all units coupled to bus 102 including the unit that provided the respective signal. In some implementations system 100 is provided as a CAN bus system. System 100 can be operative to work according to a Controller Area Network Flexible Data (CAN FD) protocol. Accordingly, in some embodiments, bus 102 can be configured to be operative to communicate signals according to a protocol as, for example, defined in a Controller Area Network (CAN) Flexible Data (CAN FD) standard.

Node 112 can comprise a controller 114 and a transceiver 116. Likewise, node 122 can comprise a controller 124 and a transceiver 126. Further likewise, node 132 can comprise a controller 134 and a transceiver 136. Below, reference will typically only be made to one node 112; it should be understood though, that other nodes 122, 132, to the extent of relevance to the concepts disclosed herein, can comprise like elements and can be configured to be operative like the referenced node 112.

Controller 114 can be configured to process digital data. In an implementation controller 114 can be coupled to node memory (not shown in FIG. 1) and configured to write and/or read digital data from the node memory. In some implementations, the digital data can be associated with signals communicated on bus 102. In some embodiments, controller 114 is connected to transceiver 116 by a node data line 115. In some embodiments, node data line 115 is internal to node 112. Node data line 115 can be provided as a single physical line, a pair of physical lines, a node bus, for example having a control bus portion and/or a data bus portion, fiber, air for inductive, capacitive and/or electromagnetic coupling of controller 112 to transceiver 116. In some embodiments note data line 115 can be configured to be operative bi-directionally, i.e., signal line 117 can transmit the first signal from transceiver 116 to bus 102 and signal line 117 can transmit the second signal from bus 102 to transceiver 116.

Transceiver 116 can be configured to receive a controller digital signal from controller 114, to provide a first signal representative of information comprised in the controller digital signal and to provide the first signal at an output of transceiver 116 for transmission to bus 102. Further, transceiver 116 can be configured to receive a second signal from bus 102 at an input, to associate a digital signal with the received second signal and to provide the associated digital signal to controller 112, for example, for processing.

Coupling of node 112 to bus 102 can be provided by a signal line 117 that connects transceiver 116 of node 112 to bus 102. As in the case of data line 115, also signal line 117 can be provided as a single physical line, a pair of physical lines, a node bus, for example having a control bus portion and/or a data bus portion, fiber, air for inductive, capacitive and/or electromagnetic coupling of transceiver 116 to bus 102 or any other medium the person skilled in the art would consider suitable for signal transmission between transceiver 116 and bus 102. Below, an embodiment will be further discussed wherein data line 117 is provided as a physical line. In some embodiments data line 117 can be configured to be operative bi-directionally, i.e., data line 117 can transmit the first signal from transceiver 116 to bus 102 and data line 117 can transmit the second signal from bus 102 to transceiver 116.

Figure 2:
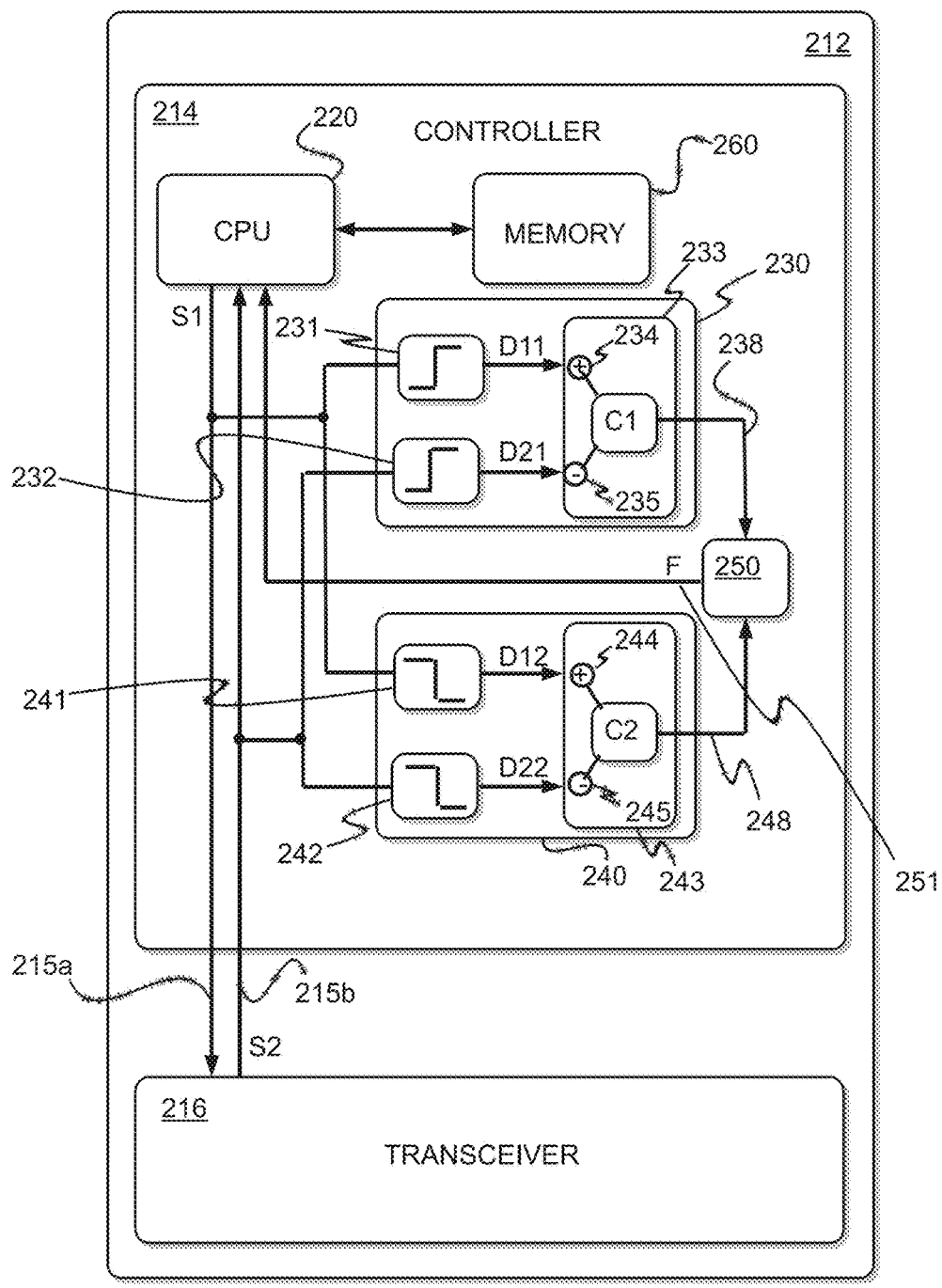
FIG. 2 is a block diagram that illustrates a node in accordance with some embodiments.

FIG. 2 illustrates an embodiment of a node 212 as an example of node 112 illustrated in FIG. 1. Node 212 can comprise a controller 214 and a transceiver 216 coupled by digital bus lines 215. In some embodiments node 212 comprises a protocol handler (not shown in FIG. 2) configured to 'scan frames', i.e., to extract information transmitted by a signal within individual time slots used for data transmission in accordance with a protocol such as defined according to a controller area network (CAN) and, as another example, according to a controller area network with flexible data rate (CAN FD). In some embodiments the protocol handler is configured to scan frames of first signals corresponding to transmit signals; in some embodiments the protocol handler is configured to scan frames of second signals corresponding to receive signals; and in some embodiments the protocol handler is configured to scan frames of both, first and second signals corresponding to receive signals and transmit signals, respectively. Controller 214 can comprise a Central Processing Unit (CPU) 220 connected via digital bus output line 215a to transceiver 216 to output digital data to transceiver 216.

In some embodiments CPU 220 can include the protocol handler. In some embodiments the protocol handler can be implemented as a state machine, as the case may be, coupled to CPU 220. In some embodiments controller 214 is configured with the protocol handler, but without CPU 220. CPU 220 can be connected to transceiver 216 by digital bus input line 215b to receive input digital data from transceiver 216. CPU 220 can also be coupled to a memory 260 that can be configured for storing data. In particular CPU 220 can be configured to read data from memory 260, for example, to be used in processing by CPU 220, and to write data to memory 260, for example, resulting from processing by CPU 220.

In some implementations, node 212 can further comprise a first counter unit 230 and a second counter unit 240. First counter unit 230 can be coupled to bus output line 215a and can receive a signal on bus output line 215a. Further, first counter unit 230 can be coupled to bus input line 215b and can receive a signal on bus input line 215b. Second counter unit 240 can be coupled to bus output line 215a and can receive a signal on bus output line 215a. Further, second counter unit 240 can be coupled to bus input line 215b to receive a signal on bus input line 215b.

First counter unit 230 can include first rising edge detector 231 and second rising edge detector 232. Further, first counter unit 230 can include a first counter element 233 having a count up input 234 and a count down input 235. Count up input 234 is connected to first rising edge detector 231. Count down input 235 is connected to second rising edge detector 232. First rising edge detector 231 can be configured to output a digital signal to input 234 of first counter element 233 upon analysing a signal on bus output line 215a to have a rising slope. Second rising edge detector 232 can be configured to output a digital signal to input 235 of first counter element 233 upon analysing a signal on bus input line 215b to have a rising slope. First counter element 233 has an output connected to a first balance signal line 238.

Second counter unit 240 can include first falling edge detector 241 and second falling edge detector 242. Further, first counter unit 240 can include a second counter element 243 having a count up input 244 and a count down input 245. Count up input 244 is connected to first falling edge detector 241. Count down input 245 is connected to second falling edge detector 242. First falling edge detector 241 can be configured to output a digital signal to input 244 of second counter element 243 upon analysing a signal on bus output line 215a to have a falling slope. Second falling edge detector 242 can be configured to output a digital signal to input 245 of second counter element 243 upon analysing a signal on bus input line 215b to have a falling slope. Second counter element 243 has an output connected to a second balance signal line 248.

In some embodiments a signal preconditioning unit (not shown in FIG. 2) such as a filter, in particular a glitch filter, can be coupled between bus input line 215b and first counter unit 230 and/or second counter unit 240. The signal preconditioning unit can be useful to filter signals to be analysed from noise, glitches or other events that, according to a rule set such as defined in a protocol, are not to be considered as error. At least one effect of the preconditioining unit can be to limit detection of error to events that, according the rule set, are error. In some embodiments, the preconditioning unit can also be connected between bus input line 215b and CPU 220 or it can form part of CPU 220. At least one effect can be that the second signal provided to CPU 220 can be preconditioned for processing by CPU 220. In particular the second signal to CPU 220 can be preconditioned as the second signal provided to first counter 230 and/or second counter unit 240.

In some embodiments another signal preconditioning unit (not shown in FIG. 2), in particular a signal delay unit, can be coupled between CPU 220 and first counter unit 230 and/or second counter unit 240. An effect can be to enable compensation of delay due transmission of the first signal on bus 102. Thus, edges in the first signal to be transmitted can be provided to first counter unit 230 and/or to second counter unit 240 with a delay compensating a portion of the delay in the second signal when the second signal corresponds to the first signal forwarded, via bus 102, to node 212. An effect can be to enable a reduction of a condition space that excludes predetermined error conditions. The reduction of the condition space can reflect known delay. Error tolerance can be reduced.

In some embodiments node 212 can have a single counter unit so that only one of first and second counter units 230 and 240 is implemented in node 212. In particular, in an embodiment the single counter unit can be configured to detect rising and falling edges. An effect can be that the counter unit does not differentiate between rising and falling edges, but detects 'edge events' irrespective of whether the respective edge is rising or falling. The presently described embodiments having both, first counter unit 230 and second counter unit 240, however, can enable a faster determination of an error condition when compared to an implementation having only a single counter unit.

In some embodiments controller 214 of node 212 can comprise an error detect element 250. Error detect element 250 can be connected to first balance signal line 238 and to second balance signal line 248. In some implementations error detect element 250 can be configured to receive signals on first balance signal line 238 and on second balance signal line 248 and determine if an error condition is fulfilled. For example, a first error condition can be predetermined such that a received first balance signal indicative of a balance count level equal to or above an error threshold count level is associated with an error condition. For another example, a second error condition can be predetermined such that a received second balance signal indicative of a balance count level equal to or above another error threshold count level is associated with an error condition. In an embodiment the another error threshold count level is the same as the error threshold count level. For a further example, a third error condition can be predetermined such that a received first balance signal indicative of a balance count level equal to or below an error floor count level is associated with an error condition. For yet a further example, a fourth error condition can be predetermined such that a received second balance signal indicative of a balance count level equal to or below another error floor count level is associated with an error condition. In an embodiment the another error floor count level is the same as the error floor count level. Combinations of the above-described error conditions and other error conditions can be defined. In some implementations, another error condition can be predetermined such that at least one predetermined of the following error conditions is sufficient to establish the another error condition: the first error condition, the second error condition, the third error condition and/or the second error condition. In some implementations, the another error condition can be predefined such that a predetermined combination of first balance count level and second balance count level as indicated by the signals respectively received on the first balance signal line and on the second balance signal line need to be established or exceeded in order to determine an error condition.

In some embodiments (not shown in FIG. 2) error detect element 250 is provided as an OR gate. At a first input, the OR gate can be configured to receive, for example via first balance signal line 238, a first error flag indicative of value C1 meeting an error condition or not. At a second input, the OR gate can be configured to receive, for example via second balance signal line 248, a second error flag indicative of value C2 meeting another error condition or not. The OR gate can further be configured to provide at an output an error flag indicative of an error condition, if at least one of first and second error flags are indicative of an error condition.

An output of error detect element 250 can be connected to a feedback line 251 that can be configured to feed-back information indicative of an error condition being fulfilled to CPU 220, for example, as the case may be, to the protocol handler comprised in CPU 220. An implementation where feedback line 251 directly connects to CPU 220 can also be contemplated.

Figure 3:
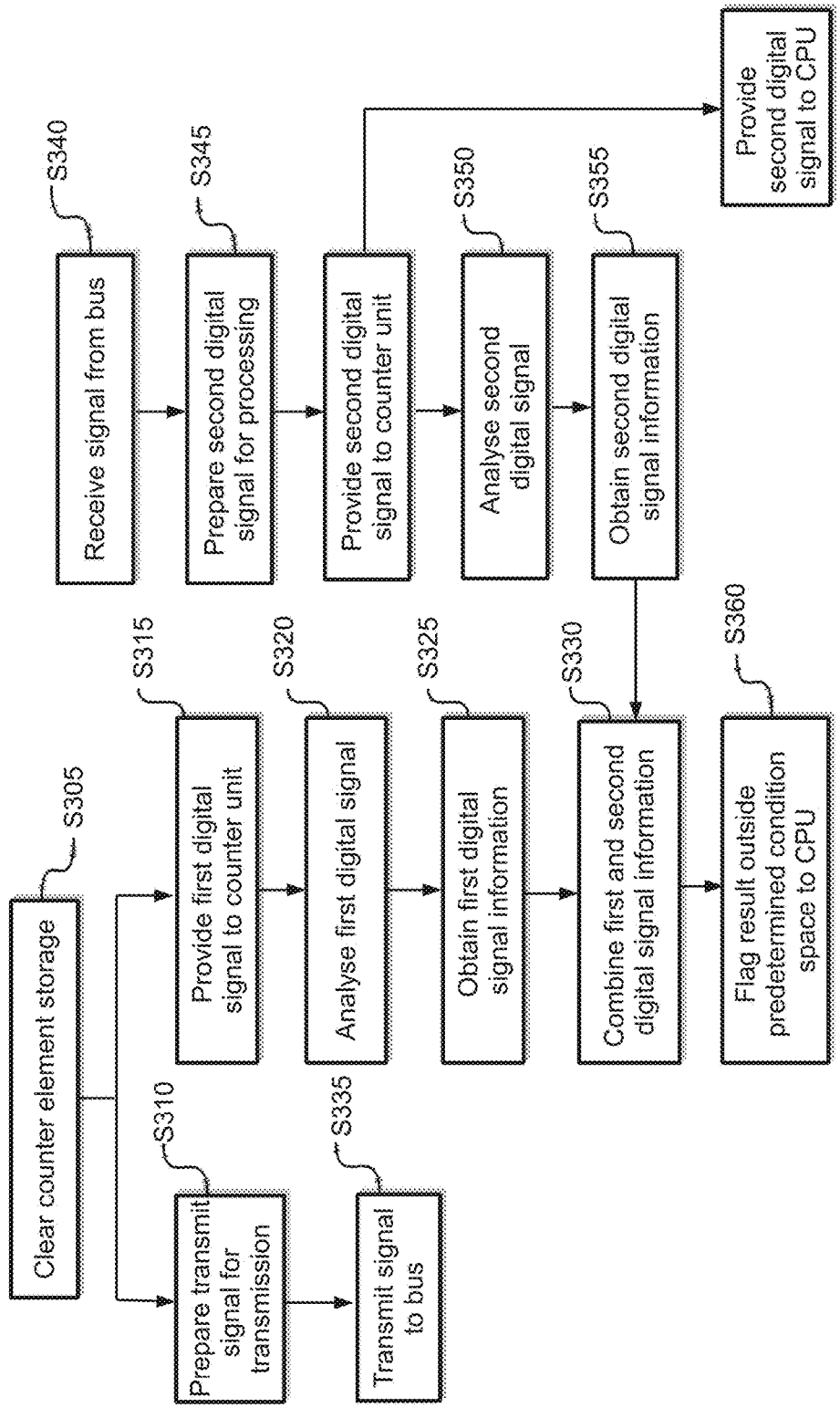
FIG. 3 shows a flow chart illustrating a method in accordance with some embodiments.

FIG. 3 shows a flow chart illustrating a method in accordance with some embodiments implemented, for example, in a system such as the system of FIGS. 1 and 2. In some embodiments the method is implemented for use in a particular transmission mode. For example, in a CAN bus system operative to work according to a Controller Area Network Flexible Data (CAN FD) protocol, transmission of data from node 112 to bus 102 can be set to a flexible mode wherein the system is adapted to transmit data at a flexible data rate. Flexibility is achieved in some implementations by allowing for a switch to a fast bit rate inside a time slot, sometimes also called frame, for transmission of data. The fast bit rate can be implemented, for example, by continuously transmitting data during a predetermined duration inside the frame. Below, the wording 'continuous' is used with reference to this duration inside the frame.

Now reference is made to FIG. 3 to describe embodiments of the method in a continuous mode. At S305, upon entry into the continuous mode, first counter element 233 and second counter element 243 are cleared or otherwise initialized. For example, a value C1 stored in first counter element 233 can be set to zero or, as the case may be, to another start value, and a value C2 stored in second counter element 243 can be set to zero or, as the case may be, to yet another start value. Having completed clearance, in some embodiments steps described below can be performed concurrently.

At S310, CPU 220 provides first digital signal S1 on line 215a to transceiver 216. At S315, first digital signal S1 is also provided to first counter unit 230. Further, first digital signal S1 is provided to second counter unit 240. At S320, first counter unit 230 performs an analysis of first digital signal S1 and second counter unit 240 also performs an analysis of first digital signal S1. First counter unit 230 directs first digital signal S1 to first rising edge detector 231. Second counter unit 240 directs first digital signal S1 to first falling edge detector 241. First rising edge detector 231 detects a rising edge, if any, in first digital signal S1 and, at S325, if so, outputs a first rising edge detection signal D11 for feeding to count up input 234 of first counter element 233. First falling edge detector 241 detects a falling edge, if any, in first digital signal S1 and, also at S325, if so, outputs a first falling edge detection signal D12 for feeding to count up input 244 of second counter element 243. Thus, at S325, first digital signal information about presence of the rising edge or presence of the falling edge in first digital signal S1 is obtained. In other embodiments (not shown in FIG. 3) CPU 220, or, as the case may be, another generator of first digital signal S1 can provide the first digital signal information instead of, or in addition to, using edge detectors 231 and 241 or otherwise analysing first digital signal S1.

At S330, first counter element 233 accepts first rising edge detection signal D11 at input 234 and increases a rising edge counter value stored in first counter element 233. Also at S330, second counter element 243 accepts first falling edge detection signal D12 at input 244 and increases a falling edge counter value stored in second counter element 243.

Also at S310, CPU 220 prepares a first digital signal S1 for transmission to bus 102. First digital signal S1 is fed to transceiver 116. At S335, transceiver 116 provides a corresponding transmit signal A1 for transmission to bus 102. Bus 102 can feed forward transmit signal A1 to other nodes 122 and 132 coupled to bus 102. Further, bus 102 can also feed forward transmit signal A1 to node 112.

At S340, a receive signal A2 from bus 102 is received at node 112 and fed to transceiver 116. At S345, transceiver 216 provides a corresponding second digital signal S2 on line 215b to CPU 220 for processing. Second digital signal S2 is also provided to first counter unit 230. Further, second digital signal S2 is provided to second counter unit 240. At S350, first counter unit 230 performs an analysis of second digital signal S2 and second counter unit 240 also performs an analysis of second digital signal S2. First counter unit 230 directs second digital signal S2 to second rising edge detector 232. Second counter unit 240 directs second digital signal S2 to second falling edge detector 242. Second rising edge detector 232 detects a rising edge, if any, in second digital signal S2 and, at S355, if so, outputs a second rising edge detection signal D21 for feeding to count down input 235 of first counter element 233. Second falling edge detector 242 detects a falling edge, if any, in second digital signal S2 and, also at S355, if so, outputs a second falling edge detection signal D22 for feeding to count down input 245 of second counter element 243. Thus, at S355, second digital signal information about presence of the rising edge or presence of the falling edge in second digital signal S2 is obtained.

Again at S330, first counter element 233 accepts second rising edge detection signal D21 at input 235 and decreases rising edge counter value C1 stored in first counter element 233. Also at S330, second counter element 243 accepts second falling edge detection signal D22 at input 245 and decreases a falling edge counter value stored in second counter element 243. Thus, at S330, first digital signal information and second digital signal information are combined, since rising edge counter value C1 is increased by first rising edge detection signal D11 and rising edge counter value C1 is decreased by second rising edge detection signal D21. Still at S30, first digital signal information and second digital signal information are further combined, since falling edge counter value C2 is increased by first falling edge detection signal D12 and falling edge counter value C2 is decreased by second falling edge detection signal D22. First counter element 233 outputs the rising edge counter value stored in first counter element 233 and provides the rising edge counter value via first balance signal line 238 to error detect element 250. Second counter element 243 outputs the falling edge counter value stored in second counter element 243 and provides the falling edge counter value via second balance signal line 248 to error detect element 250.

At S360, error detect element 250 can use the rising edge counter value and/or the falling edge counter value to determine, if an error condition is fulfilled. In some embodiments an error threshold count level can be set to a predetermined value. Further, an error floor count level can be set another predetermined value. Different error threshold count level values and/or different error floor count level values can be predetermined each for use in detecting an error condition. Combinations of values can be predetermined for use in detecting an error condition. Merely to give one example of predetermined values, error detect element 250, in some embodiments, can determine, for example, an error condition to be present, if either one of first and second counter element values C1 or C2 is equal to or exceeds a threshold count level value of 3, or if either one of first and second error counter element values C1 or C2 is equal to or below a floor count level value of −3. It should be understood that the person skilled in the art will predetermine respective values for error threshold count level and for error floor count level in accordance with structural or other circumstances. For example, in some implementations, a time required from transmitting a signal from transceiver 216 in node 112 via feed forward on bus 102 to transceiver 216 of the same node 112 and a number of bits that can be signalled during this time can determine an error condition where this number is exceeded, since a larger counter element value than this number would be indicative of not all bits that were transmitted by transceiver 216 of node 112 to also have been received by transceiver 216 of node 112.

If error detect element 250 determined an error condition, error detect element 250 outputs a signal F indicative of the error condition to CPU 220 via line 251. Signal F, for example, can be an error flag. Having received signal F, CPU 220 can then process signal F. In some embodiments CPU 220 can use a protocol handler for processing. For example, responsive to signal F, CPU 220 can issue a corresponding error signal to transceiver 216 for transmission to bus 102 whence a bus error signal is fed forward to other nodes 122 and 132 coupled to bus 102.

Some steps described above can be performed concurrently. In addition, a final balancing step can be performed, for example after having completely transmitted transmit signal A1, to determine if a final balance is as expected in case of correct feed forward of the complete transmit signal A1 to node 112. In some embodiments, for example, a balance of zero can be indicative of the transmit signal having completely been fed forward from node 112 to node 112 and thus can be used to confirm successful transmission of complete transmit signal A1 from node 112 onto bus 102, since as many rising/falling edges in the complete second digital signal S2 corresponding to the complete receive signal A2 were detected as there were counted rising/falling edges in the complete first digital signal S1 corresponding to the complete transmit signal A1.

Figure 4:
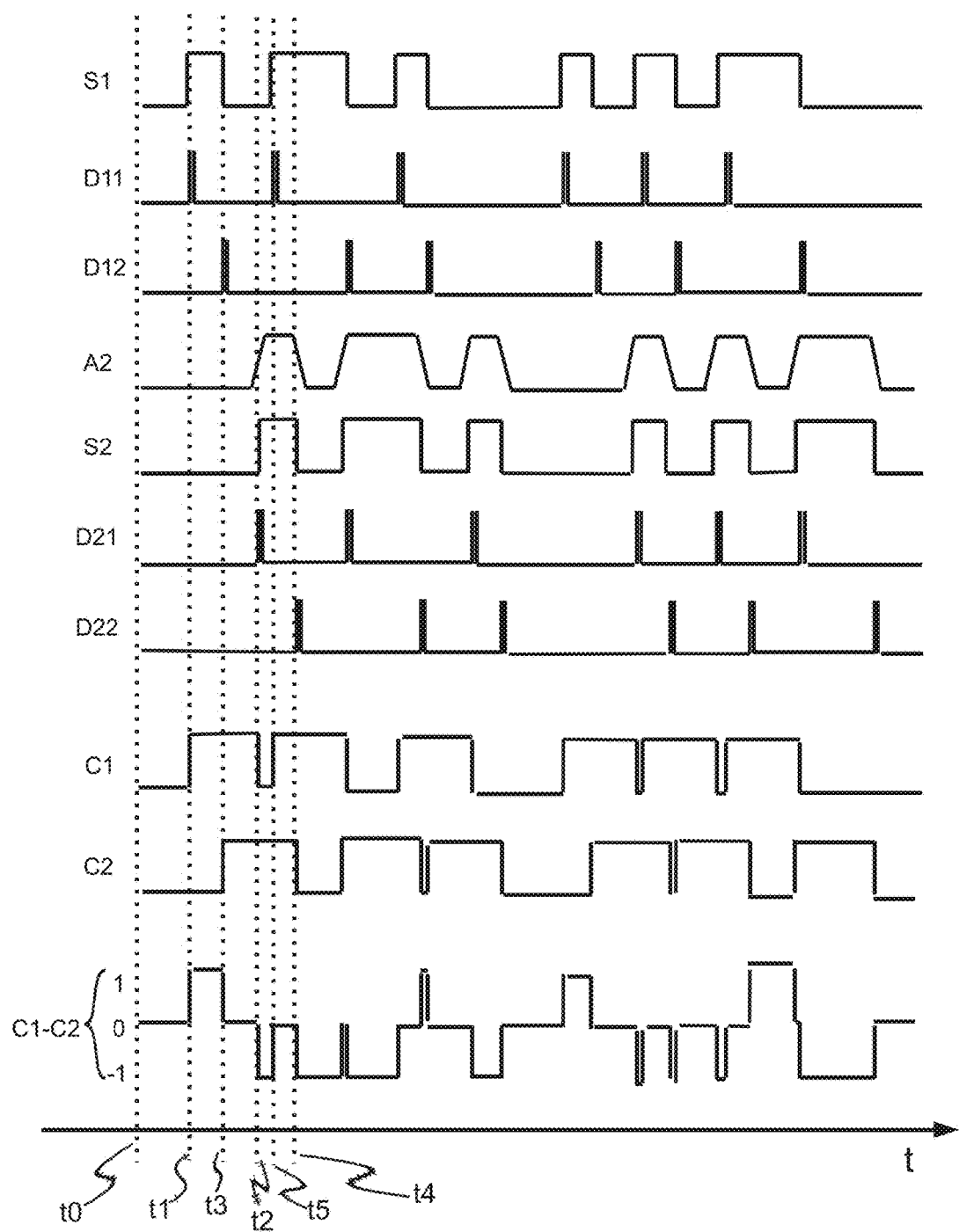
FIG. 4 is a time diagram illustrating a time line with signalling according to some embodiments.

FIG. 4 is a time diagram illustrating a time line showing a period where signalling being performed according to some embodiments. It should be noted that the signal pattern shown is an excerpt of an arbitrary signal and only for the purpose of illustration. In an implementation, for example, in accordance with a CAN FD protocol, other signal patterns may occur. The period shown starts at a time t0. From time t0, CPU 220 provides first digital signal S1 on line 215a to transceiver 216; as described above, first digital signal S1 can also be provided to first counter unit 230 and to second counter unit 240. Further, from time t0, bus 102 can transmit receive signal A2 to node 112. Transceiver 216 receives receive signal A2 and, based on receive signal A2, forms second digital signal S2 to be provided to CPU 220 for processing. Second digital signal S2 can also be provided to first counter unit 230 and to second counter unit 240. Signalling and counting during an initial portion of the period shown in FIG. 4 will now be described in detail below. Signalling and counting during other portions of the period can be understood in light of the description of the initial portion.

At time t1, CPU 220 sets first digital signal S1 from 0 to 1. Thus, at time t1, first digital signal S1 has a rising edge.

First counter unit 230 performs an analysis of first digital signal S1. First rising edge detector 231 detects a rising edge in first digital signal S1. First rising edge detector 231, at time t1, outputs a first rising edge detection signal D11 to count up input 234 of first counter element 233. First counter unit 230 increases a value C1 stored in first counter element 233 by 1. Value C1, with the previous clearance of first counter element 233 having been set to 0, is thus set to 1 at time t1. It should be understood that for signals to travel and be processed inside node 112, a non-zero amount of time is needed. Strictly speaking, time t1 encompasses a plurality of times, i.e., a process time interval, for the signal to travel to different parts of circuitry of node 112. However, in comparison with the duration of travelling along bus 102, differences of time within the process time interval are so small that this description refers to the process time interval as a single point in time.

Second counter unit 240 can perform an analysis of first digital signal S1. However, at time t1, first falling edge detector 241 does not detect any falling edge in first digital signal S1. First falling edge detector 241 outputs a first falling edge signal D12 at zero level to count up input 244 of second counter element 243. Accordingly, value C2 stored in second counter element 243 remains unchanged.

Meanwhile, transceiver 216, based on first digital signal S1, forms a transmit signal A1 (not shown in FIG. 4) and transmits transmit signal A1 to bus 102. Bus 102 transmits transmit signal A1 to other nodes 122, 132 and, after a time interval dt used by transmit signal A1 to travel on bus 102, also feeds forward transmit signal A1 to node 112.

At time t2, transceiver 216 receives receive signal A2 and, based on receive signal A2, forms second digital signal S2 to be provided to CPU 220 for processing. In some implementations, where t2 follows on t1 by an interval dt used by transmit signal to travel on bus 102 from node 112 to node 112, receive signal A2 at time t2 can represent the same information as transmit signal A1 at time t1. While it may be understood that time t2 follows time t1 by the time interval dt that was used by transmit signal A1 to travel from transceiver 116 on bus 102 to be received by transceiver 116 as receive signal A2, in some embodiments knowledge of time interval dt is not strictly required.

First counter unit 230 performs an analysis of second digital signal S2. Second rising edge detector 232 detects a rising edge in second digital signal S2. Second rising edge detector 232, at time t2, outputs a second rising edge detection signal D21 to count down input 235 of first counter element 233. First counter unit 230 decreases value C1 stored in first counter element 233 by 1.

Second counter unit 240 can perform an analysis of second digital signal S2. However, at time t2, second falling edge detector 242 does not detect any falling edge in second digital signal S2. Second falling edge detector 242 outputs a second falling edge signal D22 at zero level to count down input 245 of second counter element 243. Accordingly, value C2 stored in second counter element 243 remains unchanged.

At time t3, CPU 220 sets first digital signal S1 from 1 to 0. Thus, at time t3, first digital signal S1 has a falling edge.

First counter unit 230 can perform an analysis of first digital signal S1. However, at time t3, first rising edge detector 231 does not detect any rising edge in first digital signal S1. First rising edge detector 231 outputs first rising edge signal D11 at zero level to count up input 234 of first counter element 233. Accordingly, value C1 stored in first counter element 233 remains unchanged.

Second counter unit 240 performs an analysis of first digital signal S1. First falling edge detector 241 detects a falling edge in first digital signal S1. First falling edge detector 241, at time t3, outputs first falling edge detection signal D12 to count up input 244 of second counter element 243. Second counter unit 240 increases a value C2 stored at second counter element 243 by 1. Value C2, with the previous clearance of second counter element 243 having been set to 0, is thus set to 1 at time t3.

Meanwhile, as described above, transceiver 216, based on first digital signal forms first signal A1 and transmits signal A1 to bus 102. Bus 102 transmits transmit signal A1 to other nodes 122, 132 and, after a time interval dt used by transmit signal A1 to travel on bus 102, also feeds forward transmit signal A1 to node 112.

At time t4, transceiver 216 receives receive signal A2 and forms second digital signal S2 as described above.

First counter unit 230 performs an analysis of second digital signal S2. Second rising edge detector 232 detects a rising edge in second digital signal S2. At time t4, second rising edge detector 232 outputs second rising edge detection signal D21 to count down input 235 of first counter element 233. First counter unit 230 decreases value C1 stored in first counter element 233 by 1.

Second counter unit 240 can perform an analysis of second digital signal S2. However, at time t4, second falling edge detector 242 does not detect any falling edge in second digital signal S2. Second falling edge detector 242 outputs second falling edge signal D22 at zero level to count down input 245 of second counter element 243. Accordingly, value C2 stored in second counter element 243 remains unchanged.

While first digital signal S1 and second digital signal S2 are analysed, as described above with respect to first time interval 410, first counter unit 230 by keeping value C1 keeps track of a balance of rising edges transmitted and rising edges received. Further, second counter unit 240, by keeping value C2, keeps track of a balance of falling edges transmitted and falling edges received.

As described above with reference to error detect element 250, an error condition can be predetermined such that a balance count level equal to or above an error threshold count level is associated with an error condition. For example, an error threshold count level can be set to 3. It should be understood that this selection of threshold value to be associated with an error condition is merely for the purpose of illustration; in accordance with requirements and circumstances of an implementation other values can be predetermined as a threshold value to be associated with an error condition. In the example shown in FIG. 4, values C1 and C2 do not exceed the predetermined threshold value, but are either 0 or 1. Therefore, in this example no error condition can be detected. In some implementations, where value C1 and value C2 are fed to error detect element 250, a difference value C1-02 can be updated. In some implementations, feeding of values C1 and C2 to error detect element 250 and forming of difference value C1-02 can be performed continuously. FIG. 4 illustrates a result where values are 1, 0, and −1 depending on the values C1 and C2 at any time.

Figure 5:
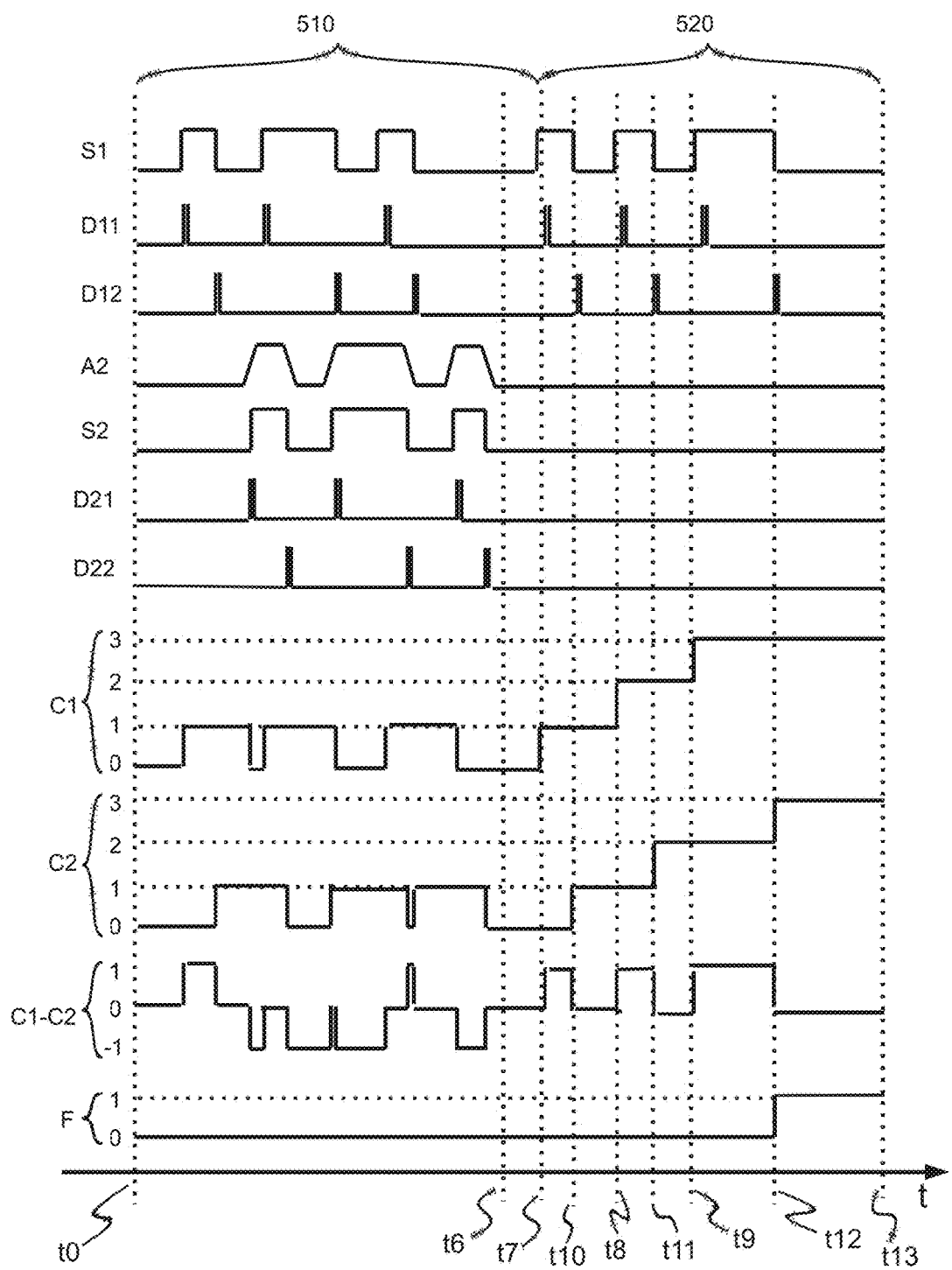
FIG. 5 is another time diagram illustrating a time line with signalling according to some embodiments.

FIG. 5 is another time diagram illustrating a time line showing a period where signalling is performed according to some embodiments. For the purpose of illustration, an implementation is contemplated where an error condition is defined as a condition where both counter values C1 and C2 are equal to or above the threshold value 3. Other error conditions such as at least one of counter values C1 and C2 being equal or above the threshold value 3 could be contemplated as well. Consequently, in case error detect element 250 detects this condition, error detect element 250 is to set a level of error signal F fed to CPU 220 via line 251 and on line 215b from 0 to 1.

The signalling and counting period shown in FIG. 5 starts at a time t0 and has a first period portion 510 and a second period portion 520. First period portion starts from time t0 and lasts to time t6. First period portion 510 comprises signalling and counting exactly as shown in FIG. 4 and, accordingly, also as described above with reference to FIG. 4. Consequently, first period portion 510 will not be discussed below.

Second period portion 520 starts at time t6 and lasts to the end of the period shown in FIG. 5 at time t13. Signalling and counting in second period portion 520 differs from that shown in FIG. 4 during the same time in that receive signal A2 received by transceiver 216 during second period portion 520 does not correspond to first digital signal S1.

At time t6, CPU 220 provides first digital signal S1 on line 215a to transceiver 216; as described above, first digital signal S1 can also be provided to first counter unit 230 and to second counter unit 240. However, in contrast to the embodiment shown in FIG. 4, due to an impediment of unknown nature, transmit signal A1 (not shown in FIG. 5) that represents first digital signal S1 on bus 102 is not forwarded to node 112. Nevertheless, from time t6, bus 102 can transmit receive signal A2 to node 112. Transceiver 216 receives receive signal A2 and, based on receive signal A2, forms second digital signal S2 to be provided to CPU 220 for processing. Second digital signal S2 can also be provided to first counter unit 230 and to second counter unit 240. Signalling and counting during second period portion 520 shown in FIG. 5 will now be described in detail below. In particular, error signal F will be described.

At time t7, CPU 220 sets first digital signal S1 from 0 to 1. Thus, at time t7, first digital signal S1 has a rising edge.

First counter unit 230 performs an analysis of first digital signal S1. First rising edge detector 231 detects a rising edge in first digital signal S1. First rising edge detector 231, at time t7, outputs a first rising edge detection signal D11 to count up input 234 of first counter element 233. First counter unit 230 increases a value C1 stored in first counter element 233 by 1. Value C1, with the previous value of first counter element 233 at time t6 having been 0, is thus set to 1 at time t7.

Second counter unit 240 can perform an analysis of first digital signal S1. However, at time t7, first falling edge detector 241 does not detect any falling edge in first digital signal S1. First falling edge detector 241 outputs a first falling edge signal D12 at zero level to count up input 244 of second counter element 243. Accordingly, value C2 stored in second counter element 243 remains unchanged.

Meanwhile, transceiver 216, based on first digital signal S1, forms a transmit signal A1 (not shown in FIG. 5) and transmits transmit signal A1 to bus 102. However, bus 102 is kept from transmitting transmit signal A1 to other nodes 122, 132 and does not feed forward transmit signal A1 to node 112.

At any time after time t6, transceiver 216 receives receive signal A2 and, based on receive signal A2, forms second digital signal S2 to be provided to CPU 220 for processing. However, due to the transmission impediment on bus 102, at no time after time t6, receive signal A2 can represent the same information as transmit signal A1 at time t1.

First counter unit 230 performs an analysis of second digital signal S2. However, second rising edge detector 232 does not detect any rising edge in second digital signal S2. Second rising edge detector 232 outputs a second rising edge detection signal D21 at zero level to count down input 235 of first counter element 233. Consequently, first counter unit 230 does not decrease value C1 stored in first counter element 233.

Second counter unit 240 can perform an analysis of second digital signal S2. However, second falling edge detector 242 does not detect any falling edge in second digital signal S2. Second falling edge detector 242 outputs a second falling edge signal D22 at zero level to count down input 245 of second counter element 243. Accordingly, value C2 stored in second counter element 243 remains unchanged.

At time t10, CPU 220 sets first digital signal S1 from 1 to 0. Thus, at time t10, first digital signal S1 has a falling edge.

First counter unit 230 can perform an analysis of first digital signal S1. However, at time t10, first rising edge detector 231 does not detect any rising edge in first digital signal S1. First rising edge detector 231 outputs first rising edge signal D11 at zero level to count up input 234 of first counter element 233. Accordingly, value C1 stored in first counter element 233 remains unchanged.

Second counter unit 240 performs an analysis of first digital signal S1. First falling edge detector 241 detects a falling edge in first digital signal S1. First falling edge detector 241, at time t10, outputs first falling edge detection signal D12 to count up input 244 of second counter element 243. Second counter unit 240 increases a value C2 stored at second counter element 243 by 1. Value C2, with the previous value of second counter element 243 at time t6 having been 0, is thus set to 1 at time t10.

Meanwhile, as described above, transceiver 216, based on first digital signal forms first signal A1 and transmits signal A1 to bus 102. However, bus 102 cannot feed forward transmit signal A1 to node 112. Consequently, first counter unit 230 does not decrease value C1 stored in first counter element 233, and second counter unit 240 does not decrease value C2 stored in second counter element 243.

At time t8, CPU 220 sets first digital signal S1 from 0 to 1. Thus, at time t8, first digital signal S1 has a rising edge.

First counter unit 230 performs an analysis of first digital signal S1. First rising edge detector 231 detects a rising edge in first digital signal S1. First rising edge detector 231, at time t8, outputs a first rising edge detection signal D11 to count up input 234 of first counter element 233. First counter unit 230 increases a value C1 stored in first counter element 233 by 1. Value C1, with the previous value of first counter element 233 at time t7 having been 1, is thus set to 2 at time t8.

Second counter unit 240 can perform an analysis of first digital signal S1. However, at time t8, first falling edge detector 241 does not detect any falling edge in first digital signal S1. First falling edge detector 241 outputs a first falling edge signal D12 at zero level to count up input 244 of second counter element 243. Accordingly, value C2 stored in second counter element 243 remains unchanged.

At time t11, CPU 220 sets first digital signal S1 from 1 to 0. Thus, at time t11, first digital signal S1 has a falling edge.

First counter unit 230 can perform an analysis of first digital signal S1. However, at time t11, first rising edge detector 231 does not detect any rising edge in first digital signal S1. First rising edge detector 231 outputs first rising edge signal D11 at zero level to count up input 234 of first counter element 233. Accordingly, value C1 stored in first counter element 233 remains unchanged.

Second counter unit 240 performs an analysis of first digital signal S1. First falling edge detector 241 detects a falling edge in first digital signal S1. First falling edge detector 241, at time t11, outputs first falling edge detection signal D12 to count up input 244 of second counter element 243. Second counter unit 240 increases a value C2 stored at second counter element 243 by 1. Value C2, with the previous value of second counter element 243 at time t10 having been 1, is thus set to 2 at time t11.

At time t9, CPU 220 sets first digital signal S1 from 0 to 1. Thus, at time t9, first digital signal S1 has a rising edge.

First counter unit 230 performs an analysis of first digital signal S1. First rising edge detector 231 detects a rising edge in first digital signal S1. First rising edge detector 231, at time t9, outputs a first rising edge detection signal D11 to count up input 234 of first counter element 233. First counter unit 230 increases a value C1 stored in first counter element 233 by 1. Value C1, with the previous value of first counter element 233 at time t8 having been 2, is thus set to 3 at time t9.

Second counter unit 240 can perform an analysis of first digital signal S1. However, at time t9, first falling edge detector 241 does not detect any falling edge in first digital signal S1. First falling edge detector 241 outputs a first falling edge signal D12 at zero level to count up input 244 of second counter element 243. Accordingly, value C2 stored in second counter element 243 remains unchanged.

At time t12, CPU 220 sets first digital signal S1 from 1 to 0. Thus, at time t12, first digital signal S1 has a falling edge.

First counter unit 230 can perform an analysis of first digital signal S1. However, at time t12, first rising edge detector 231 does not detect any rising edge in first digital signal S1. First rising edge detector 231 outputs first rising edge signal D11 at zero level to count up input 234 of first counter element 233. Accordingly, value C1 stored in first counter element 233 remains unchanged.

Second counter unit 240 performs an analysis of first digital signal S1. First falling edge detector 241 detects a falling edge in first digital signal S1. First falling edge detector 241, at time t12, outputs first falling edge detection signal D12 to count up input 244 of second counter element 243. Second counter unit 240 increases a value C2 stored at second counter element 243 by 1. Value C2, with the previous value of second counter element 243 at time t11 having been 2, is thus set to 3 at time t12.

While first digital signal S1 and second digital signal S2 are analysed, as described above with respect to second period portion 520, first counter unit 230 by keeping value C1 keeps track of a balance of rising edges transmitted and rising edges received. Further, second counter unit 240, by keeping value C2, keeps track of a balance of falling edges transmitted and falling edges received. In some implementations, where value C1 and value C2 are fed to error detect element 250, a difference value C1-C2 can be updated as shown in FIG. 5. In some implementations, feeding of values C1 and C2 to error detect element 250 and forming of difference value C1-C2 can be performed continuously. FIG. 5 illustrates a result where values are 1, 0, and −1, depending on the values C1 and C2 at any time. Further, error detect element 250, at time 12, detects that absolute values of both counter values C1 and C2 are equal to or above threshold value 3. Consequently, error detect element 250 sets a level of signal F output to CPU 220 from 0 to 1. Thus, signal F is indicative of an error condition and alarms CPU 220, for example, to issue a corresponding first digital signal S1 to transceiver 216 for transmitting a corresponding transmit signal A1 to bus 102.

Instead of the threshold value 3, another value could be selected. A consideration taken into account when selecting threshold value can be the length of duration dt that is needed for signal A1 to travel on bus 102 and be fed forward to node 112 in comparison with a typical expected number of rising edges or falling edges that can occur during this time and thus imbalance counter values in accordance with expectations. Further, in accordance with some embodiments error detect element 250 forms signal F to provide differentiated information on the detected error condition. For example, error signal F can be set to zero level, if no error was found, set to level 1 if a predetermined threshold value is exceeded by value C1 stored in first counter unit 230 or if the predetermined threshold value is exceed by value C2 stored in second counter unit 240, and error signal F can be set to level 2, if both, value C1 and value C2, are detected to exceed the predetermined value. In some implementations, multiple threshold values can be predetermined to enable a still more differentiated detection of the error condition.

Figure 6:
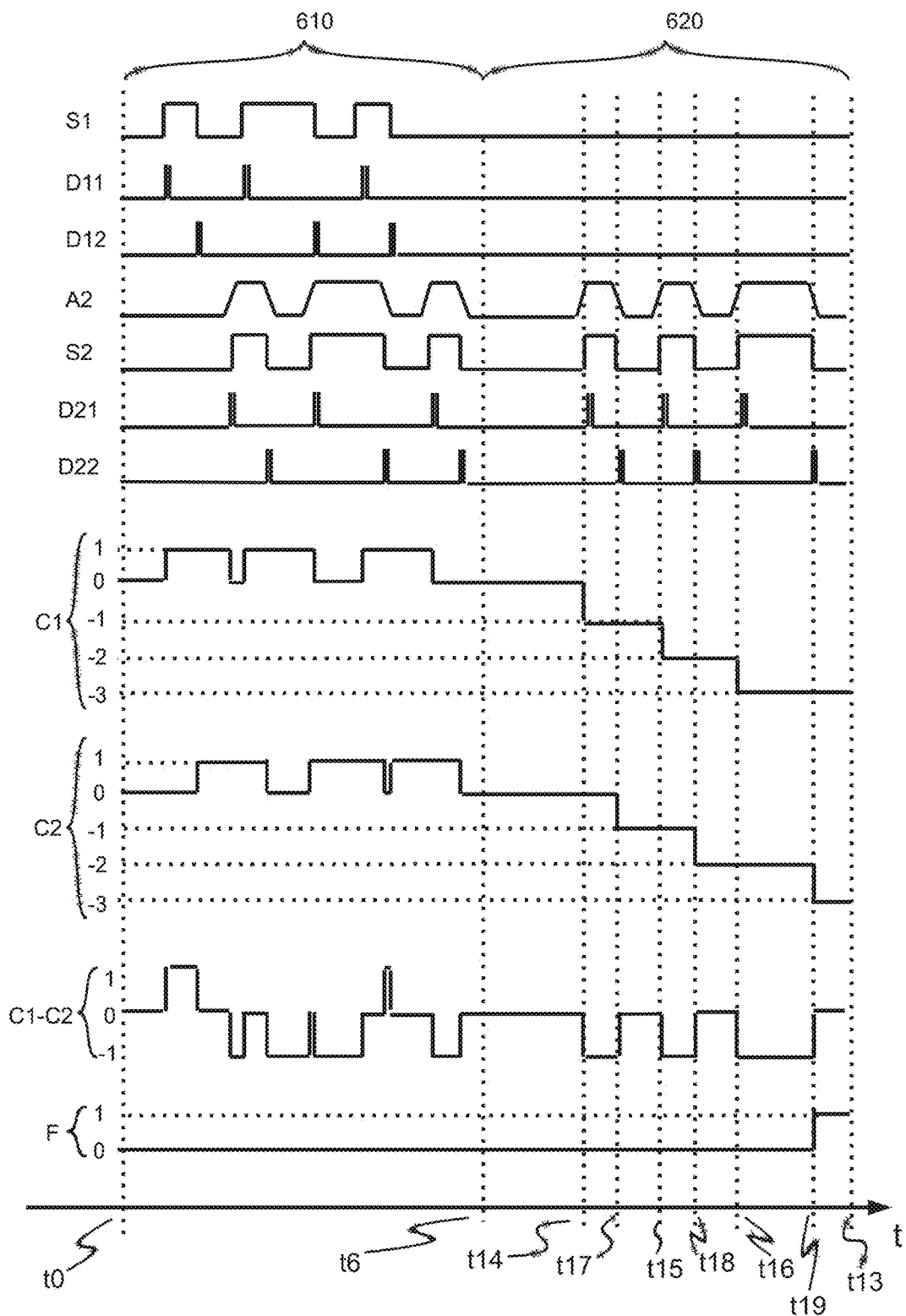
FIG. 6 is yet another time diagram illustrating a time line with signalling according to some embodiments.

FIG. 6 is yet another time diagram illustrating a time line showing a period where signalling is performed according to some embodiments. As described with respect to FIG. 5, for the purpose of illustration, an implementation is contemplated where an error condition is defined as a condition where absolute values of both counter values C1 and C2 are equal to or above the threshold value 3. Other error conditions such as at least one of counter values C1 and C2 being equal or above the threshold value 3 could be contemplated as well.

The signalling and counting period shown in FIG. 6 starts at a time t0 and has a first period portion 610 and a second period portion 620. First period portion starts from time t0 and lasts to time t6. First period portion 610 comprises signalling and counting exactly as shown in FIG. 4 and, accordingly, also as described above with reference to FIG. 4. Consequently, first period portion 610 will not be discussed below.

Second period portion 620 starts at time t6 and lasts to the end of the period shown in FIG. 6 at time t13. Signalling and counting in second period portion 620 differs from that shown in FIG. 4 during the same time in that a pattern of receive signal A2 received by transceiver 216 during second period portion 620 does not correspond to any pattern in first digital signal S1.

From time t6 throughout second period portion 620, CPU 220 provides first digital signal S1 at level zero to transceiver 216, to first counter unit 230 and to second counter unit 240. However, for example due to transmit activity of another node 122 or 132, from time t6, transceiver 216 receives receive signal A2 having, at times, a non-zero signal level. Based on receive signal A2, transceiver 216 forms second digital signal S2 to be provided to CPU 220, to first counter unit 230 and to second counter unit 240. Signalling and counting during second period portion 620 shown in FIG. 6 will now be described in detail below. In particular, error signal F will be described.

At any time after time t6, CPU 220 provides a zero level first digital signal S1 to transceiver 216, to first counter unit 230 and to second counter unit 240.

First counter unit 230 performs an analysis of first digital signal S1. However, first rising edge detector 231 does not detect any rising edge in first digital signal S1. First rising edge detector 231 outputs a first rising edge detection signal D11 at zero level to count up input 234 of first counter element 233. Consequently, first counter unit 230 does not increase value C1 stored in first counter element 233.

Second counter unit 240 can perform an analysis of first digital signal S1. However, first falling edge detector 241 does not detect any falling edge in first digital signal S1. First falling edge detector 241 outputs a first falling edge signal D12 at zero level to count up input 244 of second counter element 243. Accordingly, second counter unit 240 does not count up value C2 stored in second counter element 243.

At time t14, corresponding to an increasing level in received receive signal A2, a level of second digital signal S2 is set from 0 to 1. Thus, at time t14, second digital signal S2 has a rising edge.

First counter unit 230 performs an analysis of second digital signal S2. Second rising edge detector 232 detects a rising edge in second digital signal S2. Second rising edge detector 232, at time t14, outputs a second rising edge detection signal D21 to count down input 235 of first counter element 233. First counter unit 230 decreases value C1 stored in first counter element 233 by 1. Value C1, with the previous value of first counter element 233 at time t6 having been 0, is thus set to −1 at time t14.

Second counter unit 240 can perform an analysis of second digital signal S2. However, at time t14, second falling edge detector 242 does not detect any falling edge in second digital signal S2. Second falling edge detector 242 outputs a second falling edge signal D22 at zero level to count down input 245 of second counter element 243. Accordingly, second counter unit 240 does not count down value C2 stored in second counter element 243.

At time t17, while CPU 220 continues to provide a zero level first digital signal S1 to transceiver 216, to first counter unit 230 and to second counter unit 240, transceiver 216 receives receive signal A2 having a signal level that decreases from 1 to 0. Accordingly, transceiver 216 sets the level of second digital signal S2 from 1 to 0. Thus, at time t17, second digital signal S2 has a falling edge.

First counter unit 230 can perform an analysis of first digital signal S1. As described above, at time t17, first counter unit 230 does not count up value C1 stored in first counter element 233.

Second counter unit 240 can perform an analysis of first digital signal S1. As described above, at time t17, second counter unit 240 does not count down value C2 stored in second counter element 243.

First counter unit 230 can perform an analysis of second digital signal S2. Second rising edge detector 232 does not detect any rising edge in second digital signal S2. As described above, at time t17, first counter unit 230 does not count down value C1 stored in first counter element 233.

Second counter unit 240 performs an analysis of second digital signal S2. Second falling edge detector 242, at time t17, outputs second falling edge detection signal D22 to count down input 245 of second counter element 243. Second counter unit 240 decreases value C2 stored in second counter element 243 by 1. Value C2, with the previous value of second counter element 243 at time t6 having been 0, is thus set to −1 at time t17.

At time t15, another rising edge can be detected in second digital signal S2. As described with respect to time t14, first counter unit 230 decreases value C1 by 1, from −1 to −2, while second counter unit 240 does neither increase nor decrease value C2.

At time t18, another falling edge can be detected in second digital signal S2. As described with respect to time t17, second counter unit 240 decreases value C2 by 1, from −1 to −2, while first counter unit 230 does neither increase nor decrease value C1.

At time t16, yet another rising edge can be detected in second digital signal S2. As described with respect to time t10, first counter unit 230 decreases value C1 by 1, from −2 to −3, while second counter unit 240 does neither increase nor decrease value C2.

At time t19, yet another falling edge can be detected in second digital signal S2. As described with respect to time t17, second counter unit 240 decreases value C2 by 1, from −2 to −3, while first counter unit 230 does neither increase nor decrease value C1.

While first digital signal S1 and second digital signal S2 are analysed, as described above with respect to second period portion 620, first counter unit 230, by keeping value C1, keeps track of a balance of rising edges transmitted and rising edges received. Further, second counter unit 240, by keeping value C2, keeps track of a balance of falling edges transmitted and falling edges received. In some implementations, where value C1 and value C2 are fed to error detect element 250, a difference value C1-C2 can be updated as shown in FIG. 6 and as also described above with reference to FIG. 4 and FIG. 5. Further, error detect element 250, at time t19, can detect that absolute values of both counter values C1 and C2 are equal to or above threshold value 3. Consequently, at time t19, error detect element 250 sets a level of signal F output to CPU 220 from 0 to 1. Thus, signal F is indicative of an error condition and alarms CPU 220, for example, to issue a corresponding first digital signal S1 to transceiver 216 for transmitting a corresponding transmit signal A1 to bus 102. In accordance with some embodiments, as described with reference to FIG. 5, error detect element 250 forms signal F to provide differentiated information on the detected error condition.

Figure 7:
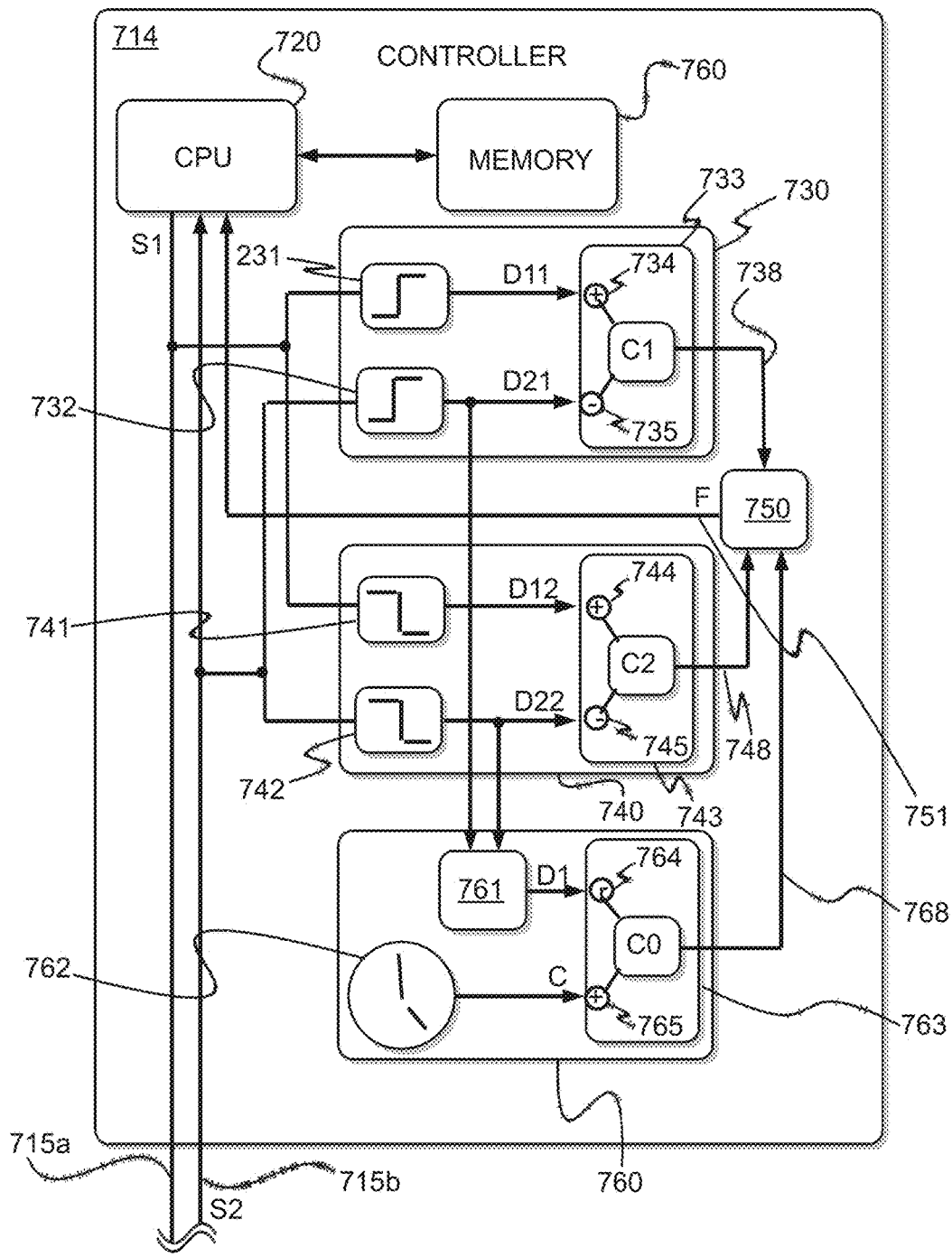
FIG. 7 is a block diagram that illustrates a controller for a node in accordance with some embodiments.

FIG. 7 is a block diagram that illustrates a controller 714 for a node in accordance with some embodiments. Controller 714 comprises elements that correspond to those of controller 214 shown in node 212 of FIG. 2. In particular, controller 714 comprises first and second counter unit 730 and 740, respectively, configured to analyse a signal fed to the units. As described above with reference other illustrated implementations, also in the embodiments illustrated in FIG. 7 the analysis can comprise a detection of edges/slopes in the respective signal. For a description of the same elements reference is therefore made to the description of FIG. 2. Further, controller 714 comprises a timeout detect unit 760.

Timeout detect unit 760 can include a transmit logic 761 and a clock 762. Further, timeout detect unit 760 can include a timer element 763 having a count up input 765 and a reset input 764. A first input to transmit logic 761 is coupled to an output of second rising edge detector 732 in first counter unit 730. A second input to transmit logic 761 is coupled to an output of second falling edge detector 742 in second counter unit 740. Transmit logic 761 can include an OR gate to output a logic OR signal responsive to signals received at first and second input to transmit logic 761. Further, in some embodiments transmit logic 761 can be configured to provide a logic signal D1 to reset input 764 of timer element 763. In an embodiment clock 762 can be configured to provide a clock signal C to count up input 765 of timer element 763. Clock 762 can, for example, be configured to provide a secondary clock signal derived from some primary clock signal used in operation of controller 716. Timer element 763 can be coupled, for example via a timeout signal line 768, to error detect element 750. Error detect element 750 can be configured to include an OR logic gate function for output of a error signal F to CPU 720, for example via line 751 to, as the case may be, the protocol handler comprised in CPU 720.

Figure 8:
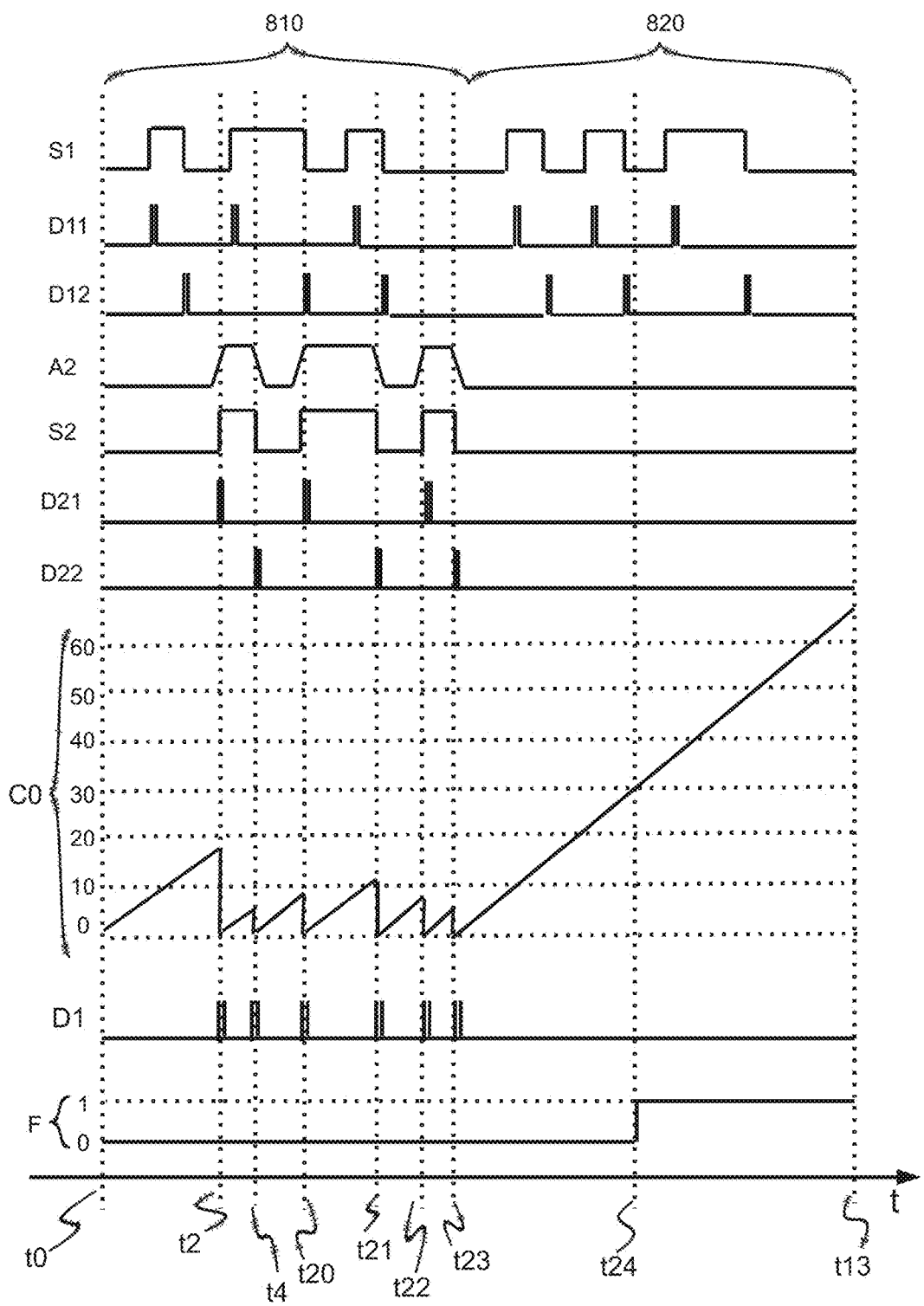
FIG. 8 is a time diagram illustrating a time line with signalling according to further embodiments.

FIG. 8 is a time diagram illustrating a time line showing a period where signalling is performed according to further embodiments, for example, as described with reference to FIG. 7. For the purpose of the description of operation, the transceiver (not shown in FIG. 7) provides second digital signal S2 as described above with reference to FIG. 4.

At time t0, signal levels can be zero. Clock 762 provides clock signal C (not shown in the time diagram of FIG. 8) to count up input 765 of timer element 763. Accordingly, during an interval from time t0 to time t2, timeout detect unit 760 increments a value C0 stored in timer element 763. Meanwhile, the transceiver receives receive signal A2 and provides corresponding second digital signal S2 to first counter unit 730 and to second counter unit 740. At time t2, second rising edge detector 731 detects a rising slope in second digital signal S2 and outputs a corresponding signal D21 to reset input 764 of timer element 763. Accordingly, at time t2, timeout detect unit 760 resets value C0 stored in timer element 763 to zero.

During an interval from time t2 to time t4, again following clock signal C, timeout detect unit 760 increments value C0 stored in timer element 763. At time t4, second falling edge detector 742 detects a falling slope in second digital signal S2 and outputs a corresponding signal D22 to reset input 764 of timer element 763. Accordingly, at time t4, timeout detect unit 760 resets value C0 stored in timer element 763 to zero.

During an interval from time t4 to time t20, again following clock signal C, timeout detect unit 760 increments value C0 stored in timer element 763. At time t20, second rising edge detector 731 detects a rising slope in second digital signal S2 and outputs a corresponding signal D21 to reset input 764 of timer element 763. Accordingly, at time t20, timeout detect unit 760 resets value C0 stored in timer element 763 to zero.

During an interval from time t20 to time t21, again following clock signal C, timeout detect unit 760 increments value C0 stored in timer element 763. At time t21, second falling edge detector 742 detects a falling slope in second digital signal S2 and outputs a corresponding signal D22 to reset input 764 of timer element 763. Accordingly, at time t21, timeout detect unit 760 resets value C0 stored in timer element 763 to zero.

During an interval from time t21 to time t22, again following clock signal C, timeout detect unit 760 increments value C0 stored in timer element 763. At time t22, second rising edge detector 731 detects a rising slope in second digital signal S2 and outputs a corresponding signal D21 to reset input 764 of timer element 763. Accordingly, at time t22, timeout detect unit 760 resets value C0 stored in timer element 763 to zero.

During an interval from time t22 to time t23, again following clock signal C, timeout detect unit 760 increments value C0 stored in timer element 763. At time t23, second falling edge detector 742 detects a falling slope in second digital signal S2 and outputs a corresponding signal D22 to reset input 764 of timer element 763. Accordingly, at time t23, timeout detect unit 760 resets value C0 stored in timer element 763 to zero.

In the interval from time t23 to the end of the period shown in FIG. 8 at time t13, no further edges are detected in second digital signal S2. As a consequence, timeout detect unit 760 does not reset value C0 stored in timer element 763 to zero. Instead, following clock signal C, timeout detect unit 760 continues to increment value C0. At time t24, value C0 is equal or exceeds a predetermined threshold timer value (in the example shown in FIG. 8 the threshold timer value is 30). Accordingly, timer element 763 outputs a non-zero signal to error detect unit 750. Consequently, OR logic in error detect unit 750 sets a level of error signal F to 1 and outputs error signal F to CPU 720 for processing.

Further Embodiments

This description, in an aspect according to some embodiments, describes a method for use in a data processing system, the system having a node and a communication link. Herein a node has at least transmitter functionality and receiver functionality. In some implementations, transmitter functionality and receiver functionality are co-located in a single apparatus such as a single transceiver circuit, but transmitter functionality and receiver functionality do not necessarily need to be co-located. In an embodiment the communication link is coupled to the node. In an embodiment the communication link is coupled to at least one data processing unit. In an embodiment the communication link is operative to feed forward signals to all units coupled to the communication link. In particular the communication link can be operative to feed forward signals to the node coupled to the communication link.

An embodiment comprises obtaining a first digital signal information associated with a first signal. Herein digital signal information can relate to predetermined characteristics of the signal such as, in one example, occurrence of rising edges in the signal or, in another example, occurrence of falling edges in the signal. In some embodiments obtaining the first digital signal information can include analysing a first signal to obtain first digital signal information. An embodiment comprises storing the first digital signal information. An embodiment comprises transmitting the first signal from the node to the communication link. In some embodiments transmitting the first signal can comprise generating a transmit signal corresponding to the first signal, for example in a transceiver, and transmitting the transmit signal as the first signal. An embodiment comprises receiving a second signal from the communication link at the node. In some embodiments receiving the second signal can comprise receiving a receive signal, for example in a transceiver, and forming the second signal corresponding to the receive signal. An embodiment comprises analysing the second signal to obtain second digital signal information. An embodiment comprises combining the second digital signal information with the first digital signal information. In an embodiment the combining is performed by using the first digital signal information to count up and by using the second digital signal information to count down. At least one effect can be that in case the communication link operates to feed forward signals to units coupled to the communication link, the first signal that is transmitted to the communication link, allowing for a delay, can be received in the second signal received from the communication link. The observed second signal can be analysed. The analysed second signal can be found either to be consistent with the first signal or to be inconsistent. If found inconsistent, an error condition can be flagged.

An embodiment comprises storing a result of the combining the first digital signal information and the second digital signal information. For example, a rising slope in the receive signal can be associated with a state change from low to high in a corresponding second digital signal. In an embodiment the analysing comprises pre-determinedly associating state change with a signal behaviour. In some embodiments combining comprises registering state change. At least one effect can be that the associating a state change with the predetermined signal behaviour can be used to register the state change. For example, a CPU generating the first digital signal can also provide first digital signal information without performing an analysis of the first digital signal. In an embodiment the result of the combining is a difference between a first quantity associated with the first signal and a second quantity associated with the second signal. In some embodiments the first quantity can be of the same kind or type as the second quantity. For example, the first quantity can be rising edges in the first signal and the second quantity can be rising edges in the second signal.

In an embodiment the second signal, at a delay after the transmitting the transmit signal, can correspond to the transmit signal since the transmit signal, via the communication link, can be fed forward to the node. The delay can be determined by circumstances such as temperature and signal shape. The delay can be longer than a time required, for example, to represent a single bit in a signal pattern of the second signal. In an embodiment the delay can be within a time window defining a minimum and/or a maximum acceptable delay time. In an embodiment a predetermined delay is predetermined as a time window defining a maximum delay time. In an embodiment a predetermined delay is predetermined as a time window defining a minimum delay time. In a given implementation the time window can be predetermined to include an expected duration of signal feed forward from the node transmitting the signal, via the communication link, to the node receiving the transmitted signal.

An embodiment comprises flagging in case a result of the combining is outside a predetermined condition space. In an embodiment a condition outside the predetermined condition space is defined to be an error condition. In an embodiment the flagging includes flagging an error flag associated with the error condition. Some embodiments can also comprise flagging a result of the combining that is inside the predetermined condition space that is not associated with an error condition. In an embodiment the predetermined condition space is a balance of first digital signal information versus second digital signal information. In an embodiment the balance is a difference between a first number associated with the first digital signal information and a second number associated with the second digital signal information. In an implementation the balance can be established by counting a counter up by the first number associated with the first digital signal information and by counting the counter down by the second number associated with the second digital signal information. In an embodiment at least two different flags are associated with at least two different error conditions outside the predetermined condition space. In an embodiment the same error flag is associated with at least two different interpretations depending on circumstances. In an embodiment the flag can be indicative of a first error and, after having indicated the first error, the same flag can be indicative of a second error. For example the first error can inform about a system condition, while the second error can trigger the system into a measure, for example, to avoid future conditions to occur outside the balanced condition space. In an embodiment the condition space is predetermined so as to take account of delay in receiving the second signal that was transmitted as the first signal. In an embodiment the analysing is registering state change. In an embodiment the state change is an edge in the analysed signal. In an embodiment a threshold is predetermined to register the state change in the respective signal. In an embodiment the analysing is performed continuously. In an embodiment the combining is balancing the second digital signal information versus the first digital signal information. In an embodiment the combining is off-setting registered state changes in the second signal against registered state changes in the first signal. In an embodiment the combining is performed continuously. In some embodiments the combining is concluded to provide a final balance. The final balance can be used to confirm an expected balance and to flag an error in case the confirmation is negative.

This description in an aspect according to some embodiments describes a system for use in data processing. An embodiment comprises a node. An embodiment comprises a communication link. In an embodiment the communication link is coupled to the node and can be coupled to at least one data processing unit. In an embodiment the communication link is operative to feed forward signals to some or all units coupled to the communication link. In particular the communication link is operative to feed forward signals to the node coupled to the communication link. An embodiment comprises the system being configured to obtain first digital signal information associated with a first signal. An embodiment comprises the system being configured to analyse the first signal to obtain the first digital signal information. An embodiment comprises the system being configured to store the first digital signal information. An embodiment comprises the system being configured to transmit the first signal from the node to the communication link. An embodiment comprises the system being configured to receive a second signal from the communication link at the node. An embodiment comprises to analyse the second signal to obtain second digital signal information. An embodiment comprises to combine the second digital signal information with the first digital signal information. An embodiment of the system is configured to combine the second digital signal information with the first digital signal information by subtracting the second digital signal information from the first digital signal information. In an embodiment the system is configured to perform the receiving the second signal concurrently with transmitting the first signal. In some cases a pattern in the first signal can be observed in the second signal at a predetermined delay after the transmitting the first signal. In an embodiment the system is configured to flag a result of the combining outside a predetermined condition space. In an embodiment the system is configured to perform the combining by off-setting registered state changes in the second signal versus registered state changes in the first signal.

This description in an aspect according to some embodiments describes an apparatus for use in a data processing system, the system having a node and a communication link. In an embodiment the communication link is coupled to the node. In an embodiment the communication link is operative to feed forward signals to all units coupled to the communication link. In particular the communication link can be operative to feed forward signals to the node coupled to the communication link. In an embodiment the apparatus is configured to obtain a first digital signal information associated with a first signal. In an embodiment the apparatus is configured to transmit the first signal from the node to the communication link. In an embodiment the apparatus is configured to receive a second signal from the communication link at the node. In an embodiment the apparatus is configured to analyse the second signal to obtain second digital signal information. In an embodiment the apparatus is configured to combine the second digital signal information with the first digital signal information. In an embodiment the apparatus is configured to store a result of the combining the first digital signal information and the second digital signal information. In an embodiment the apparatus is configured to flag a result of the combining outside a predetermined condition space. In an embodiment the condition space is predetermined so as to take account of delay in being able to observe a pattern in the second signal that was transmitted with the first signal. In an embodiment the apparatus is configured to perform the analysing as registering state change. In an embodiment the state change is an edge in the analysed signal. In an embodiment a threshold is predetermined to register the state change in the respective signal. In an embodiment the apparatus is configured to perform the analysing continuously. In an embodiment the combining is balancing the second digital signal information versus the first digital signal information. In an embodiment the apparatus is configured to perform the comparing by off-setting registered state changes in the second signal versus registered state changes in the first signal. In an embodiment the comparing is performed continuously.

This description, in an aspect according to some embodiments, describes a computer-readable medium storing instruction code thereon that when executed causes one or more processors to perform steps of a method for use in a data processing system, the system having a node and a communication link. In an embodiment the communication link is coupled to the node. In an embodiment the communication link is operative to feed forward signals to some or, as the case may be, to all units coupled to the communication link. In particular the communication link can be operative to feed forward signals to the node coupled to the communication link. An embodiment comprises instruction code stored on the computer-readable medium that when executed causes steps of the method described above to be performed.

The word 'node' means an ensemble of transmitter functionality such outputting a signal and receiver functionality such inputting. In some implementations, transmitter functionality and receiver functionality are collocated in a single apparatus such as a single circuit, but transmitter functionality and receiver functionality do not necessarily need to be collocated. Herein the wording 'error condition' is used in a sense indicative of a condition that differs from an expected condition wherein the expected condition can be a condition of operating in a task-solving mode. The wording 'to perform continuously' is not necessarily to be understood as unconditionally 'always'. Conditions such as a prerequisite for a certain continuous mode of operation can be defined to be met as a requirement for a continuous performance. The continuous performance can be defined to last as long as the conditions are met. One condition can be activation of a continuous mode of operation having a predetermined condition for deactivation such as completion of a predetermined duration. For example, in transmission of a data frame, a method step to be performed continuously can be limited to transmission of a payload portion to be transmitted in the data frame while the method step is performed discontinuously to the extent that an overhead portion of the data frame is transmitted. The word 'continuous' is to be understood in accordance with a mode of operation implemented otherwise. For example, if a system is described to operate in a clocked mode, the wording 'continuous operation' can mean an operation in the clocked mode while not specifying operation in another mode. For another example, if a system is described to operate in an active mode and not to operate in an inactive mode, 'continuous operation' can mean continuous operation in the active mode and no operation while the system is in the inactive mode. Herein, the word 'exemplary' can be to mean serving as an example, instance, or illustration. Any aspect or design described herein as 'exemplary' is not necessarily to be construed as preferred or advantageous over other aspects or designs. Rather, use of the word exemplary is intended to present concepts and techniques in a concrete fashion. The term 'techniques,' for instance, may refer to one or more devices, apparatuses, systems, methods, articles of manufacture, and/or computer-readable instructions as indicated by the context described herein. "As used in this application, the term 'or' is intended to mean an inclusive 'or' rather than an exclusive 'or.' That is, unless specified otherwise or clear from context, 'X employs A or B' is intended to mean any of the natural inclusive permutations. That is, if X employs A. For the purposes of this disclosure and the claims, the terms 'coupled' and 'connected' may have been used to describe how various elements interface. Such described interfacing of various elements may be either direct or indirect.

It is to be understood that the features of the various embodiments described herein may be combined with each other, unless specifically noted otherwise. Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Exemplary implementations/embodiments discussed herein may have various components collocated. The implementations herein are described in terms of exemplary embodiments. However, it should be appreciated that individual aspects of the implementations may be separately claimed and one or more of the features of the various embodiments may be combined. For example, where some implementations were described above with respect to a first and a second functionality, other un-illustrated implementations can include only the first functionality (not second functionality) or can include only the first functionality (not the second functionality). Other permutations and combinations of the above-disclosed concepts are also contemplated as falling within the scope of the disclosure. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. While a particular feature of the disclosure may have been disclosed with respect to only one of several implementations, such feature may be combined with one or more other features of the other implementations as may be desired and advantageous for any given or particular application.

Some or all method steps described herein may be executed by (or using) a hardware apparatus, like for example, a microprocessor, a programmable computer or an electronic circuit. Depending on certain implementation requirements, embodiments of the invention can be implemented in hardware or in software. Some embodiments include a computer program for performing one of the methods described herein, stored on a machine readable carrier (or a digital storage medium, or a computer-readable medium) including, recorded thereon, the computer program for performing one of the methods described herein. The data carrier, the digital storage medium or the recorded medium are typically tangible and/or non-transitionary. One embodiment includes a processing means, for example a computer, or a programmable logic device, configured to or adapted to perform one of the methods described herein. One embodiment includes a micro-controller having installed thereon the computer program for performing one of the methods described herein. In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods can be performed by any hardware apparatus. The above-described systems, implementations, embodiments, arrangements, apparatuses and methods may be implemented in firmware, hardware, software, one or more software modules, one or more software and/or hardware testing modules, test equipment, one or more transceivers, controlled area network system nodes, one or more wired and/or wireless wide/local area network systems, one or more satellite communication systems, network-based communication systems (such as an CAN, IP, Ethernet or ATM system), or the like, or on one or more separate programmed general purpose computers having a communications device. Implementation may be in conjunction with communications protocols. Arrangements, procedures and protocols of the described implementations may be implemented on a special purpose computer, a programmed microprocessor or micro-controller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various methods, protocols and techniques according to the implementations. The disclosed embodiments, implementations and procedures and variations thereof may be readily implemented in software using object or object-oriented software development environments that provide a portable source code that can be used on a variety of computer or workstation platforms. The communication arrangements, procedures and protocols described and illustrated herein as well as variations thereof may be readily implemented in hardware and/or software using any known or later developed systems or structures, devices and/or software by those of ordinary skill in the applicable art from the functional description provided herein and with a general basic knowledge of the computer and telecommunications arts. To the extent the disclosed procedures are implemented in software that can be stored on a computer-readable storage medium, executed on a programmed general-purpose computer with the co-operation of a controller and memory, a special purpose computer, a microprocessor, or the like, the arrangements and procedures of the described implementations may be implemented as a program embedded on a personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system. The exemplary methods/processes discussed herein comprise a sequence of operations that can be implemented with hardware, software, firmware, or some combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like. Moreover, the described implementations may be similarly executed and realized by way of such hardware, software, firmware, or some combination thereof.

What is claimed is:

1. A method, for use in a data processing system, the system having a node and a communication link, wherein the communication link is coupled to the node, the method comprising:

obtaining, at each counter unit of a first counter unit and a second counter unit, first digital signal information associated with a first signal and with that counter unit, transmitting the first signal from the node to the communication link, receiving a second signal from the communication link at the node, analysing the second signal to obtain, at each counter unit of the first counter unit and the second counter unit, second digital signal information associated with the second signal and with that counter unit, and combining, at each counter unit of the first counter unit and the second counter unit, the second digital signal information associated with that counter unit with the first digital signal information associated with that counter unit, to generate a flag associated with that counter unit, combine the flag associated with the first counter unit and the flag associated with the second counter unit, wherein the combining of the flag associated with the first counter unit and the flag associated with the second counter unit comprises a Boolean OR logic operation.

2. The method of claim 1, wherein, for each counter unit of the first counter unit and the second counter unit, the flag associated with that counter unit indicates an error when a result of the combining the second digital signal information associated with that counter unit with the first digital signal information associated with that counter unit is outside a predetermined condition space.

3. The method of claim 2, wherein the predetermined condition space is predetermined so as to take account of delay in receiving the second signal that was transmitted as the first signal.

4. The method of claim 1, wherein the analyzing includes at least registering state change.

5. The method of claim 4, wherein the state change is an edge in the analyzed signal.

6. The method of claim 1, wherein the analyzing is performed continuously.

7. The method of claim 1, wherein the combining, at each counter unit of the first counter unit and the second counter unit, the second digital signal information associated with that counter unit with the first digital signal information associated with that counter unit includes at least balancing the second digital signal information associated with that counter unit versus the first digital signal information associated with that counter unit.

8. The method of claim 7, wherein the combining, at each counter unit of the first counter unit and the second counter unit, the second digital signal information associated with that counter unit with the first digital signal information associated with that counter unit includes at least off-setting registered state changes in the second signal versus registered state changes in the first signal.

9. The method of claim 1, wherein the combining, at each counter unit of the first counter unit and the second counter unit, the second digital signal information associated with that counter unit with the first digital signal information associated with that counter unit is performed continuously.

10. An apparatus, for use in a data processing system, the system having a node and a communication link, wherein the communication link is coupled to the node, the apparatus comprising:

a processor;

a storage medium coupled to the processor and comprising executable instructions, when executed by the processor, configured to:

obtain, at each counter unit of a first counter unit and a second counter unit, first digital signal information associated with a first signal and with that counter unit, transmit the first signal from the node to the communication link, receive a second signal from the communication link at the node, analyze the second signal to obtain, at each counter unit of the first counter unit and the second counter unit, second digital signal information associated with the second signal and with that counter unit, and combine, at each counter unit of the first counter unit and the second counter unit, the second digital signal information associated with that counter unit with the first digital signal information associated with that counter unit, to generate a flag associated with that counter unit, combine the flag associated with the first counter unit and the flag associated with the second counter unit, wherein the combining of the flag associated with the first counter unit and the flag associated with the second counter unit comprises a Boolean OR logic operation.

11. The apparatus of claim 10, wherein, for each counter unit of the first counter unit and the second counter unit, the flag associated with that counter unit indicates an error when a result of the combining the second digital signal information associated with that counter unit with the first digital signal information associated with that counter unit is outside a predetermined condition space.

12. The apparatus of claim 11, wherein the condition space is predetermined so as to take account of delay in receiving the second signal that was transmitted as the first signal.

13. The apparatus of claim 10, wherein the apparatus is configured to perform the analysing as registering state change.

14. The apparatus of claim 10, wherein the executable instructions are further configured to perform the combining, at each counter unit of the first counter unit and the second counter unit, the second digital signal information associated with that counter unit with the first digital signal information associated with that counter unit by off-setting registered state changes in the second signal versus registered state changes in the first signal.

15. The apparatus of claim 10, wherein the combining, at each counter unit of the first counter unit and the second counter unit, the second digital signal information associated with that counter unit with the first digital signal information associated with that counter unit is performed continuously.

16. A system, for use in data processing, comprising:

a node, and a communication link coupled to the node and adapted to be coupled to at least one data processing unit, wherein the communication link is operative to feed forward signals to the node coupled to the communication link, wherein the system is configured to:

obtain, at each counter unit of a first counter unit and a second counter unit, first digital signal information associated with a first signal and with that counter unit, transmit the first signal from the node to the communication link, receive a second signal from the communication link at the node, analyze the second signal to obtain, at each counter unit of the first counter unit and the second counter unit, second digital signal information associated with the second signal and with that counter unit, and combine, at each counter unit of the first counter unit and the second counter unit, the second digital signal information associated with that counter unit with the first digital signal information associated with that counter unit, to generate a flag associated with that counter unit, combine the flag associated with the first counter unit and the flag associated with the second counter unit, wherein the combining of the flag associated with the first counter unit and the flag associated with the second counter unit comprises a Boolean OR logic operation.

17. The system of claim 16, wherein, for each counter unit of the first counter unit and the second counter unit, the flag associated with that counter unit indicates an error when a result of the combining the second digital signal information associated with that counter unit with the first digital signal information associated with that counter unit is outside a predetermined condition space.

18. The system of claim 17, wherein the condition space is predetermined so as to take account of delay in receiving the second signal that was transmitted as the first signal.

19. The system of claim 16, wherein the system is further configured to perform the combining, at each counter unit of the first counter unit and the second counter unit, the second digital signal information associated with that counter unit with the first digital signal information associated with that counter unit by offsetting registered state changes in the first signal against registered state changes in the second signal.

20. A tangible computer-readable medium storing instruction code thereon, that when executed causes one or more processors to perform a method for use in a data processing system, the system having a node and a communication link, wherein the communication link is coupled to the node, wherein the communication link operative to feed forward signals to the node coupled to the communication link, the method comprising:

obtaining, at each counter unit of a first counter unit and a second counter unit, first digital signal information associated with a first signal and with that counter unit, transmitting the first signal from the node to the communication link, receiving a second signal from the communication link at the node, analyzing the second signal to obtain, at each counter unit of the first counter unit and the second counter unit, second digital signal information associated with the second signal and with that counter unit, and combining, at each counter unit of the first counter unit and the second counter unit, the second digital signal information associated with that counter unit with the first digital signal information associated with that counter unit, to generate a flag associated with that counter unit, combine the flag associated with the first counter unit and the flag associated with the second counter unit, wherein the combining of the flag associated with the first counter unit and the flag associated with the second counter unit comprises a Boolean OR logic operation;

wherein, for each counter unit of the first counter unit and the second counter unit, the flag associated with that counter unit indicates an error when a result of the combining the second digital signal information associated with that counter unit with the first digital signal information associated with that counter unit is outside a predetermined condition space.

* * * * *